US009334618B1

(12) United States Patent
Dodd

(10) Patent No.: US 9,334,618 B1
(45) Date of Patent: May 10, 2016

(54) FIELD DRAIN FLOAT

(71) Applicant: Jason David Dodd, Livermore, IA (US)

(72) Inventor: Jason David Dodd, Livermore, IA (US)

(*) Notice: Subject to any disclaimer, the term of this patent is extended or adjusted under 35 U.S.C. 154(b) by 164 days.

(21) Appl. No.: 14/168,669

(22) Filed: Jan. 30, 2014

(51) Int. Cl.
*E03F 5/04* (2006.01)
*E03F 1/00* (2006.01)
*E02B 15/08* (2006.01)
*E03F 5/10* (2006.01)

(52) U.S. Cl.
CPC ............... *E02B 15/0885* (2013.01); *E03F 1/00* (2013.01); *E03F 5/04* (2013.01); *E03F 5/0411* (2013.01); *E03F 5/107* (2013.01)

(58) Field of Classification Search
CPC ............... E03F 1/00; E03F 5/04; E03F 5/041; E03F 5/0411; E03F 5/06; E03F 5/107; E02B 7/50
USPC ........ 210/747.2, 747.3, 747.6, 121, 122, 163, 210/166, 170.03, 170.05, 170.09, 242.1; 405/36, 37, 40, 41, 42, 96
See application file for complete search history.

(56) References Cited

U.S. PATENT DOCUMENTS

| 1,140,903 | A | * | 5/1915 | Johnson | E03F 1/003 405/42 |
| 1,457,637 | A | * | 6/1923 | Sievers | E02B 11/005 210/163 |
| 5,104,528 | A | * | 4/1992 | Christie | B01D 17/0214 210/242.1 |
| 6,077,423 | A | * | 6/2000 | Roy | E03F 5/105 210/170.03 |
| 6,261,445 | B1 | * | 7/2001 | Singleton | E03F 5/04 210/163 |
| 6,631,588 | B1 | * | 10/2003 | Distler | E04D 13/0409 210/163 |
| 6,905,611 | B2 | * | 6/2005 | Gustafsson | B01D 17/0214 210/122 |
| 7,473,373 | B1 | * | 1/2009 | Danler | E03F 1/00 210/170.03 |
| 7,790,023 | B1 | * | 9/2010 | Mills | B01D 21/2444 210/242.1 |
| 2003/0085166 | A1 | * | 5/2003 | Dreyer | E03B 3/04 210/170.05 |
| 2011/0076100 | A1 | * | 3/2011 | Moody | E03F 5/105 405/96 |

OTHER PUBLICATIONS

Frankenberger, Jane, et al., "Agricultural and Environmental Impacts of Drainage", Indiana Agricultural Drainage Guide, http://engineering.purdue.edu/SafeWater/Drainage/drainintro.htm [retrieved from the internet Jan. 9, 2014], 6 pages.
Panuska, John, PhD, PE, "An Introduction to Agricultural Tile Drainage", Natural Resources Extension Specialist Biological Systems Engineering Department UW Madison, Sep. 21, 2012, 4 pages.

* cited by examiner

*Primary Examiner* — Christopher Upton
(74) *Attorney, Agent, or Firm* — McKee, Voorhees & Sease, PLC

(57) ABSTRACT

A field tile float is slidably mounted on a trash guard to prevent crop residue trash from clogging the drain inlet of field tile. The float includes a buoyant body extending around the trash guard cage and a guide frame slidably mounted on the trash guard post. When surface water in the field rises, the float is lifted to allow water to flow beneath the float into the drain pipe, while the buoyant body blocks field trash from clogging the trash guard.

21 Claims, 5 Drawing Sheets

FIELD DRAIN FLOAT

BACKGROUND OF THE INVENTION

Agricultural field farming requires proper amounts of water for maximum plant production. Excess water can prevent timely farm operations, restrict plant root growth, and increase erosion of the soil.

Some land has natural drainage which is sufficient for optimal crop growth and production, but much farm land requires artificial drainage for efficient agricultural crop production. In order to avoid or minimize the problems of excess rain water, many fields have subsurface tile to improve water drainage, and thereby enhance crop production. Surface water is directed to an underground drain tile or pipe via vertical pipe sections each having an upper inlet end adjacent or above the ground line. The upstanding inlet pipe may have holes or perforations of various shapes and dimensions to allow surface water to enter and flow into the subsurface tile. However, with the common practice of no till or reduced tillage farming, loose residue crop material can be carried by the surface water to the inlet which then becomes clogged with the residue material. Some farmers use trash guards in the form of wire mesh or wire cages in an effort to keep the trash from clogging the inlet. Even with such trash guards, water flow into the inlet is often diminished or stopped by residue trash collecting on the trash guard. Thus, after heavy rains, it is often necessary to check the tile inlets, and remove any trash collected on the inlet or trash guard. Such cleaning is time consuming and adds to the cost of crop production.

Therefore, there is a need for a solution to the crop residue trash problem of clogging and plugging the trash guards used with field drainage tile.

Accordingly, a primary objective of the present invention is the provision of a field tile float which protects a drain tile trash guard from collection of crop residue trash.

A further objective of the present invention is the provision of a field tile float which floats on the surface water in a field so as to the function without regard to the depth of the water.

Another objective of the present invention is the provision of a field tile float which has a simple construction and is easy to install.

Still another objective of the present invention is the provision of a field tile float which is economical to manufacture, and durable and safe in use.

These and other objectives will become apparent from the following description of the invention.

SUMMARY OF THE INVENTION

The field tile float of the present invention mounts on the extension post of a conventional trash guard used on field tile inlets. The float includes a buoyant body and a frame or guide slidably mounted on the trash guard post. The center of the float is open so as to extend 360° around the trash guard cage.

In use, the float normally rests upon the ground. When heavy rains create surface water in the field, the buoyant body floats on the water and blocks trash floating on the surface of the water from the trash guard cage. As the float rises along the trash guard post, water can flow beneath the float for passage into the tile inlet. Since the crop residue trash floats on top of the water, the trash does not pass under the float so as to clog the tile inlet or the trash guard cage.

DETAILED DESCRIPTION OF THE PREFERRED EMBODIMENTS

Figure 1:
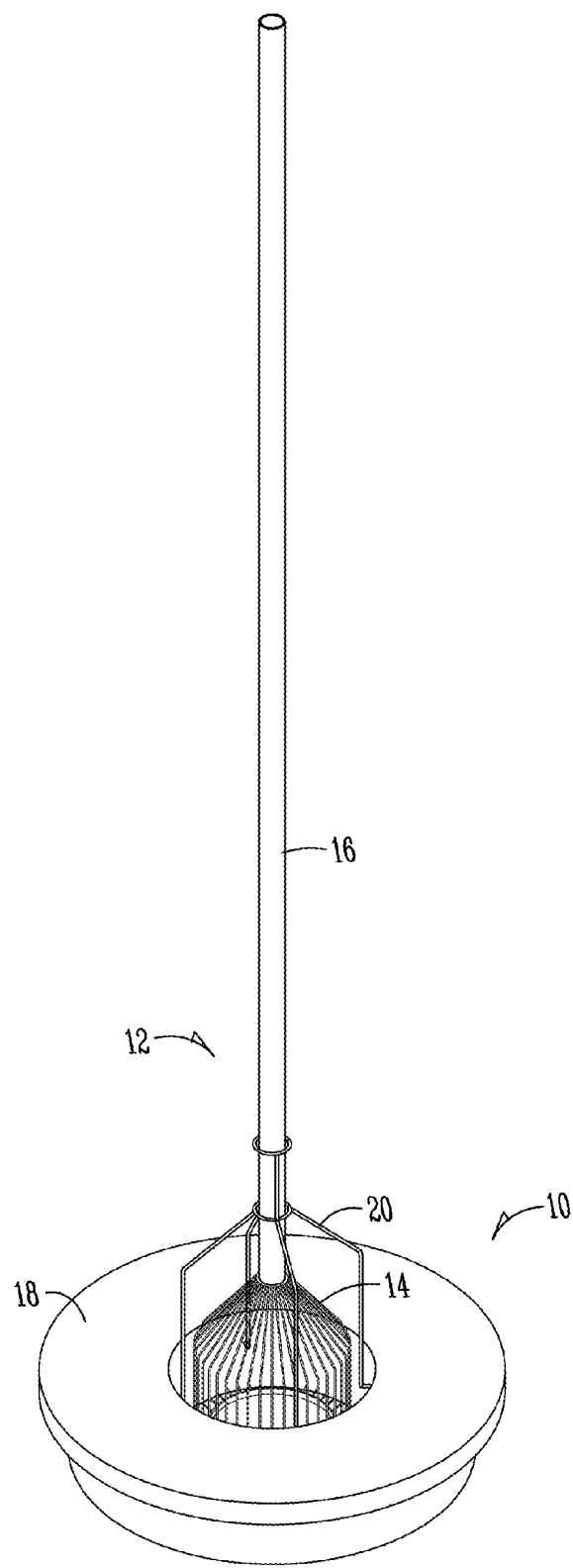
FIG. 1 is a perspective view of the field tile float of the present invention mounted on a conventional trash guard use for field tile inlets.

The field tile float of the present invention is generally designated in the drawings by the reference number 10. The float is used in conjunction with a conventional field tile inlet trash guard 12. The trash guard can take various forms, but generally includes a wire or mesh cage 14 or cover for the tile riser pipe inlet. An upstanding pipe or post 16 is often mounted on top of the cage 14 to provide easier visual identification for the location of the tile inlet.

The float 10 generally includes a buoyant body 18 and a frame or guide 20. The buoyant body 18 includes a lower end 22 and an upper end 24 having a larger diameter than the lower end 22 so as to define a radially extending lip or ledge 26.

The float guide 20 includes a plurality of legs 28 having lower ends embedded in the float body 18 and upper ends terminating in one or more rings 30. The rings 30 form a collar for receipt of the post 16. While the drawings show four legs 28 on the guide 20, it is understood that more or less legs can be provided for the guide 20. Preferably, the legs 28 are equally spaced from one another. The buoyant body 18 has an open center with a diameter larger than the diameter of the trash guard cage 14. The rings 30 have an inside diameter slightly larger than the diameter of the pipe or post 16 so that the float 10 can slide freely upwardly and downwardly along the post 16.

The buoyant body 18 can be made of any floatable material, such as foam, molded plastic, or other light weight yet rigid material. The guide 20 can be made of metal or other suitably strong material that does not easily deform.

Figure 2:
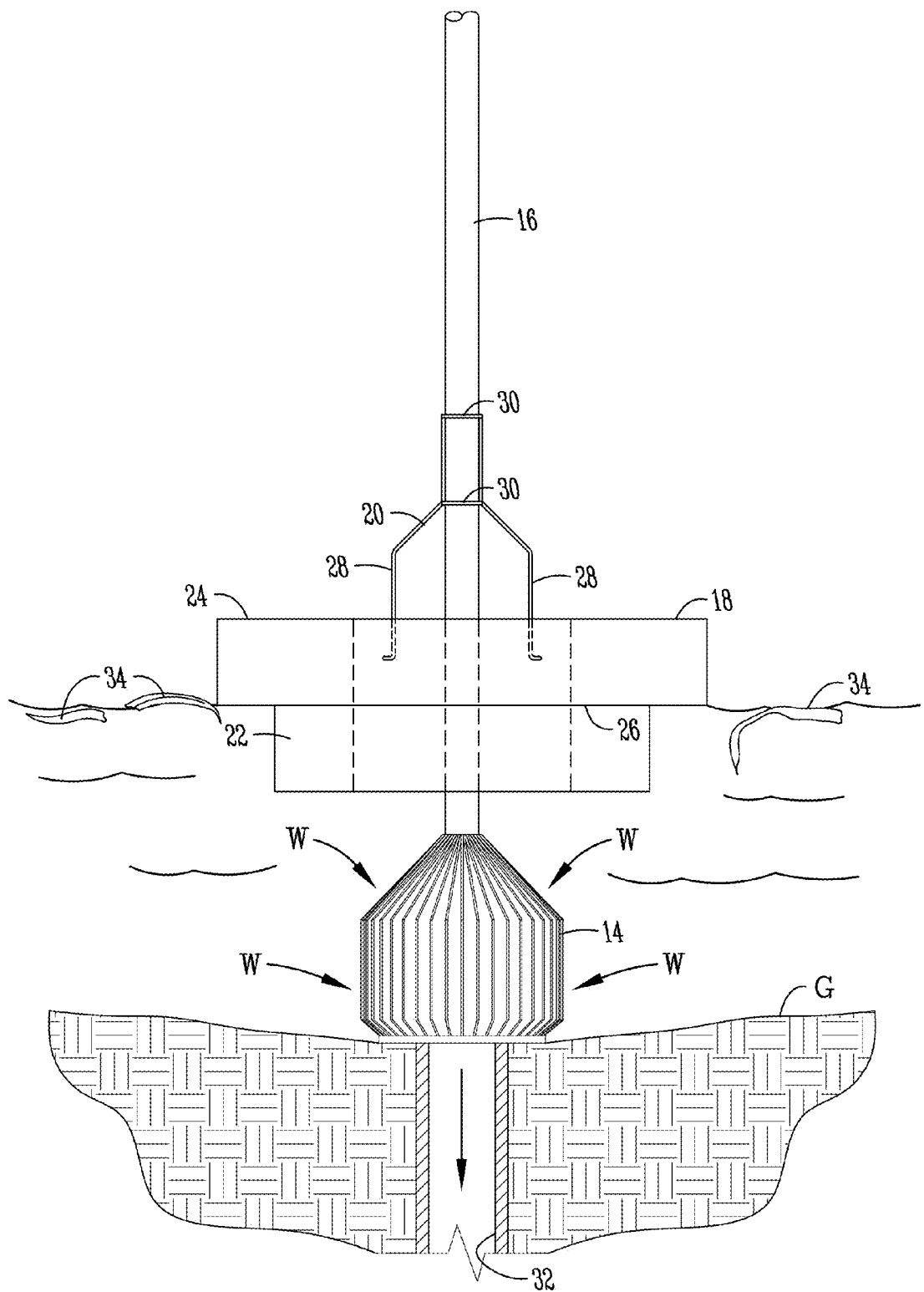
FIG. 2 is a side elevation view showing the float in a raised position resulting from surface water in the field.
Figure 3:
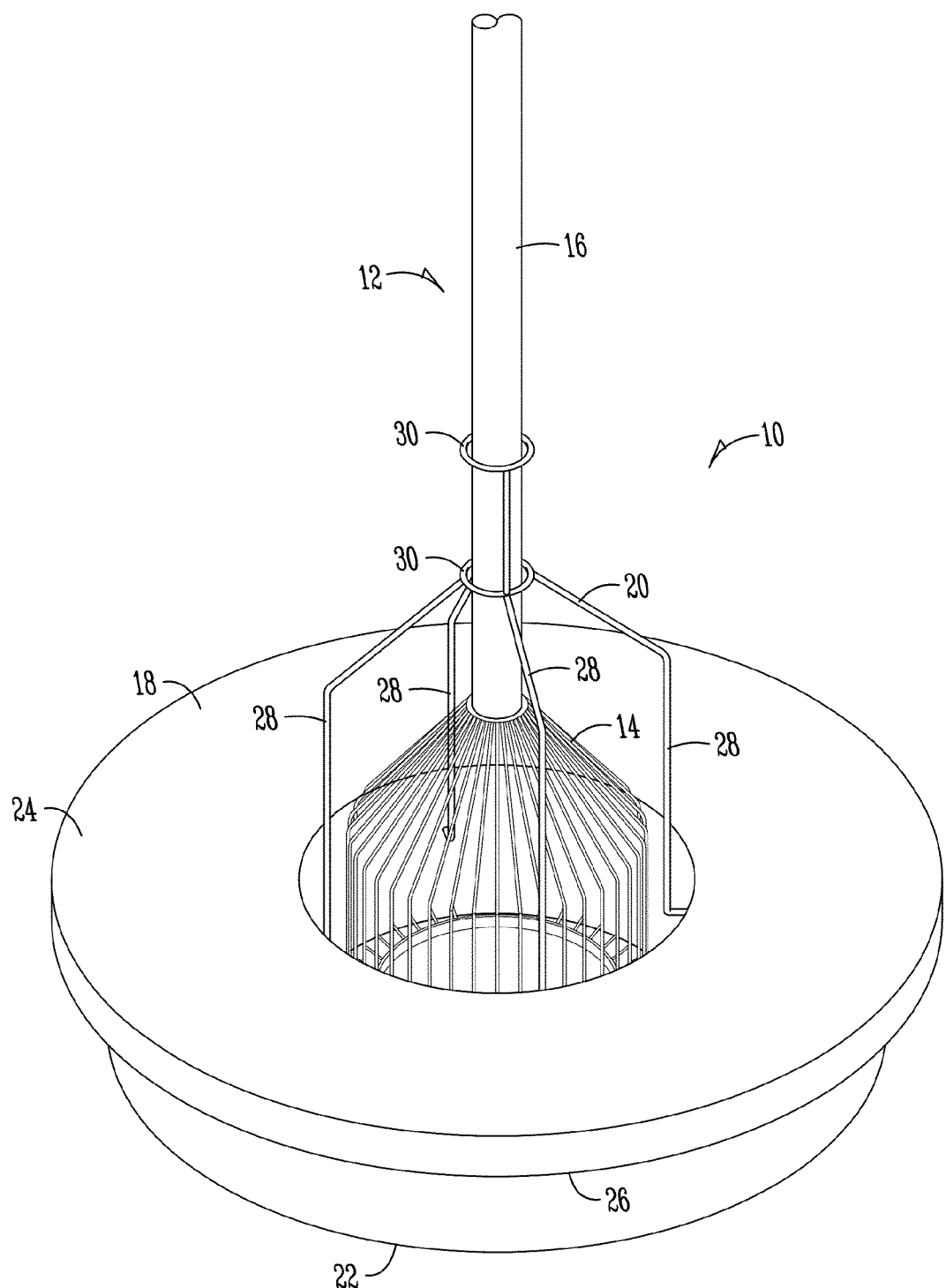
FIG. 3 is an enlarged perspective view of the float mounted on the trash guard.
Figure 4:
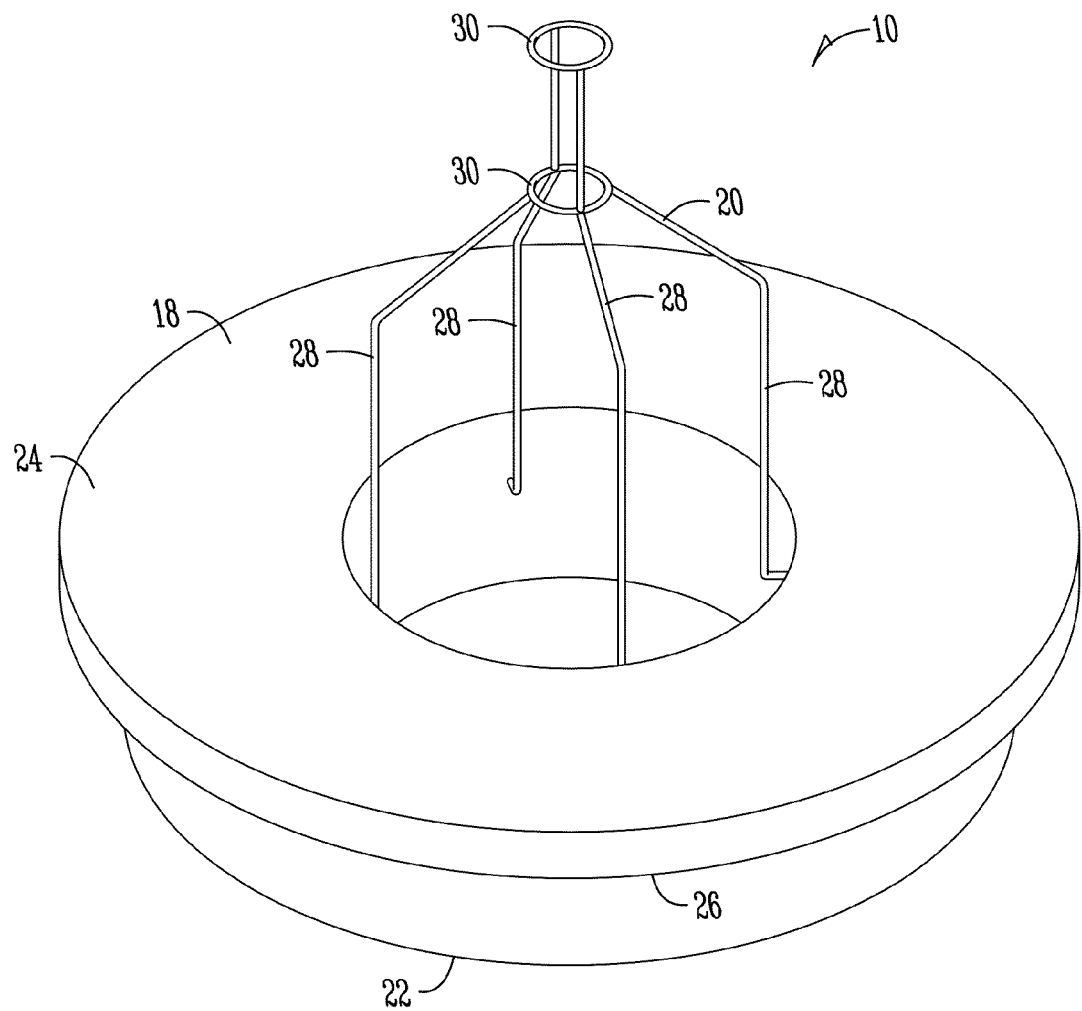
FIG. 4 is a perspective view of the float.
Figure 5:
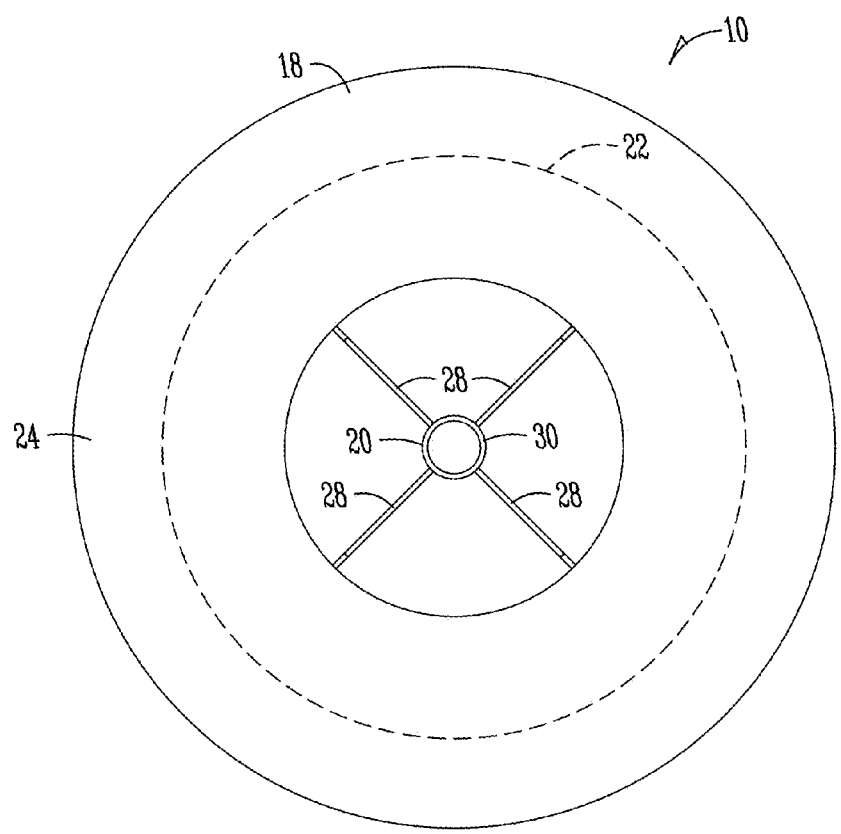
FIG. 5 is a side elevation view of the float.
Figure 6:
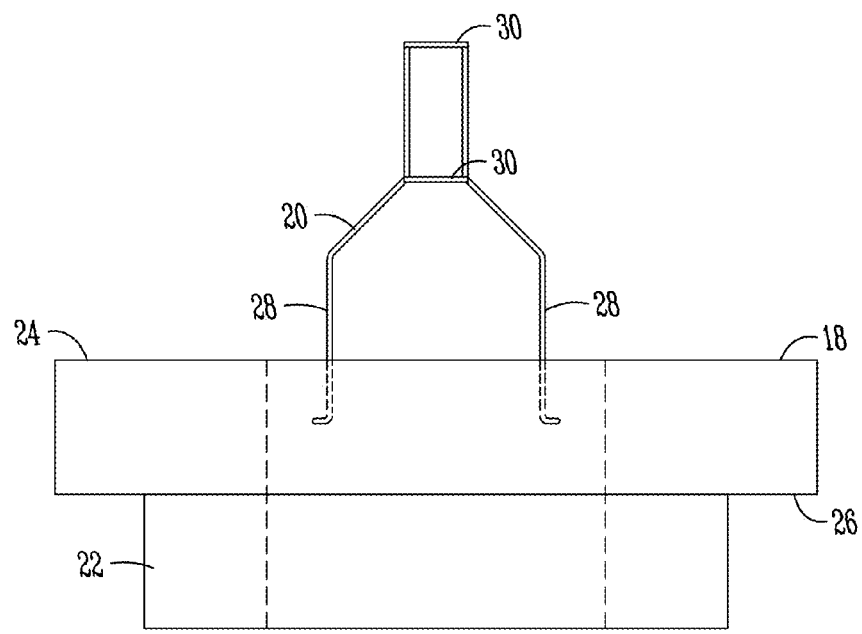
FIG. 6 is a top plan of the float.

In normal use, with the float 10 installed on the trash guard 12, the buoyant body 18 sits upon the ground G surrounding the tile inlet 32. If surface water on the field from heavy rains rises to engage the shoulder or ledge 26 of the buoyant body 18, the body will float and rise upwardly as the water depth increases. As the float 10 is lifted off the ground, surface water will flow under the lower end 22 of the float into the drain inlet, as indicated by the arrow W in FIG. 2, while the buoyant body 18 blocks trash 34 floating in the water from reaching the trash guard 12. Thus, the float 10 prevents plugging or clogging of the drain inlet from crop residue trash carried by heavy rains.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A float for an agricultural field tile inlet pipe having a trash guard over the inlet, with a post extending upwardly from the trash guard, the float comprising:

a solid buoyant body extending radially outwardly around the trash guard;

a guide slidably mountable over the post and extending upwardly from the buoyant body;

whereby the buoyant body normally sits on the ground adjacent the trash guard and floats upwardly along the post when water floods the field and thereby permit water to flow under the buoyant body to the inlet pipe while minimizing collection of field trash on the trash guard.

2. The float of claim 1 wherein the buoyant body is ring shaped so as to extend 360° around the trash guard.

3. The float of claim 1 wherein the buoyant body has a lower circular wall, an upper lip extending radially beyond the wall, and an open center.

4. The float of claim 1 wherein the buoyant body is a foam material.

5. The float of claim 1 wherein the guide has spaced apart legs and a center ring to receive the post.

6. The float of claim 1 wherein the guide has a tubular collar through which the post extends.

7. The float of claim 1 wherein the buoyant body and the guide are spaced from the trash guard.

8. The float of claim 1 wherein the guide includes a plurality of equally spaced legs to center the buoyant body around the trash guard.

9. The float of claim 1 wherein the guide resides outside the trash guard.

10. A float for an agricultural field tile inlet pipe having a trash guard over the inlet, with a post extending upwardly from the trash guard, the float comprising:
   a solid buoyant body residing around the trash guard and having a lower circular wall, and an upper lip extending radially beyond the wall; and
   a guide extending upwardly from the body and slidably received over the post so that the float can rise and fall relative to the trash guard.

11. The float of claim 10, wherein the buoyant body is ring shaped so as to extend 360° around the trash guard.

12. The float of claim 10 wherein the buoyant body has an open center and extends 360° around the trash guard.

13. The float of claim 10 wherein the buoyant body is a foam material.

14. The float of claim 10 wherein the guide has spaced apart legs and a center ring to receive the post.

15. The float of claim 10 wherein the guide has a tubular collar through which the post extends.

16. The float of claim 10 wherein the buoyant body and the guide are spaced from the trash guard.

17. The float of claim 10 wherein the guide includes a plurality of equally spaced legs to center the buoyant body around the trash guard.

18. The float of claim 10 wherein the guide resides outside the trash guard.

19. A method of protecting a trash guard of an agricultural field tile inlet pipe from collecting trash in a field, the trash guard having an upwardly extending post fixed thereto, comprising:
   placing a solid float with a guide over the post and around the trash guard; and
   allowing the float to rise off the ground to permit water in the field to flow under the float while blocking trash in the water with the float; and
   guiding the rising movement of the float with the guide sliding along the post.

20. The method of claim 19 wherein the float normally rests upon the ground.

21. The method of claim 19 wherein the guide on the float tracks along the post as the float rises and falls.

* * * * *